US009596330B2

(12) United States Patent
Caballero et al.

(10) Patent No.: US 9,596,330 B2
(45) Date of Patent: Mar. 14, 2017

(54) ANTENNA SYSTEM WITH RECEIVER DIVERSITY AND TUNABLE MATCHING CIRCUIT

(71) Applicant: Apple Inc., Cupertino, CA (US)

(72) Inventors: Ruben Caballero, San Jose, CA (US); Mattia Pascolini, San Francisco, CA (US); Mohit Narang, Cupertino, CA (US); Matthew A. Mow, Los Altos, CA (US); Robert W. Schlub, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 14/490,576

(22) Filed: Sep. 18, 2014

(65) Prior Publication Data
US 2015/0005037 A1 Jan. 1, 2015

Related U.S. Application Data

(63) Continuation of application No. 12/941,010, filed on Nov. 5, 2010, now Pat. No. 8,872,706.

(51) Int. Cl.
*H01Q 21/00* (2006.01)
*H01Q 1/24* (2006.01)
(Continued)

(52) U.S. Cl.
CPC ............ *H04M 1/026* (2013.01); *H01Q 1/243* (2013.01); *H01Q 1/44* (2013.01); *H01Q 9/0421* (2013.01);
(Continued)

(58) Field of Classification Search
CPC ......... H01Q 1/243; H01Q 1/242; H01Q 21/28
(Continued)

(56) References Cited

U.S. PATENT DOCUMENTS 4,099,184 A * 7/1978 Rapshys .................. H01Q 3/24
342/374
4,958,165 A * 9/1990 Axford .................. H01Q 13/18
343/770

(Continued)

FOREIGN PATENT DOCUMENTS

CN 1543010 11/2004
CN 101207229 6/2008
(Continued)

OTHER PUBLICATIONS

Sakaguchi et al., "Comprehensive Calibration for MIMO System", Wireless Personal Multimedia Communications, EI 2005. The 5th International Symposium on, Oct. 30, 2002, vol. 2, pp. 440-443.

*Primary Examiner* — Graham Smith
(74) *Attorney, Agent, or Firm* — Treys Law Group, P.C.; G. Victor Treyz; Michael H. Lyons

(57) ABSTRACT

Electronic devices may be provided that contain wireless communications circuitry. The wireless communications circuitry may include radio-frequency transceiver circuitry and antenna structures. An electronic device may include a display mounted within a housing. A peripheral conductive member may run around the edges of the display and housing. Dielectric-filled gaps may divide the peripheral conductive member into individual segments. A ground plane may be formed within the housing from conductive housing structures, printed circuit boards, and other conductive elements. The ground plane and the segments of the peripheral conductive member may form antennas in upper and lower portions of the housing. The radio-frequency transceiver circuitry may implement receiver diversity using both the upper and lower antennas. The lower antenna may be used in transmitting signals. The upper antenna may be tuned using a tunable matching circuit.

20 Claims, 11 Drawing Sheets

(51) Int. Cl.
*H04M 1/02* (2006.01)
*H01Q 1/44* (2006.01)
*H01Q 9/04* (2006.01)
*H01Q 9/42* (2006.01)
*H01Q 21/28* (2006.01)
*H01Q 21/30* (2006.01)

(52) U.S. Cl.
CPC ............... *H01Q 9/42* (2013.01); *H01Q 21/28* (2013.01); *H01Q 21/30* (2013.01); *H04M 1/0266* (2013.01)

(58) Field of Classification Search
USPC .................................................. 343/702, 725
See application file for complete search history.

(56) References Cited

U.S. PATENT DOCUMENTS

| | | | |
|---|---|---|---|
| 5,159,707 A | 10/1992 | Mogi et al. | |
| 5,768,691 A | 6/1998 | Matero et al. | |
| 6,021,317 A | 2/2000 | Irvin | |
| 6,339,400 B1 | 1/2002 | Flint et al. | |
| 6,373,439 B1 | 4/2002 | Zurcher et al. | |
| 6,560,443 B1 | 5/2003 | Vaisanen et al. | |
| 6,885,880 B1 | 4/2005 | Ali | |
| 7,155,178 B2 | 12/2006 | Chang et al. | |
| 7,176,838 B1* | 2/2007 | Kinezos | H01Q 1/243 343/700 MS |
| 7,239,889 B2 | 7/2007 | Saari et al. | |
| 7,271,769 B2 | 9/2007 | Asano et al. | |
| 7,612,725 B2 | 11/2009 | Hill et al. | |
| 7,768,461 B2 | 8/2010 | Cheng et al. | |
| 8,781,420 B2 | 7/2014 | Schlub | |
| 2004/0192406 A1 | 9/2004 | Okazaki | |
| 2004/0227674 A1 | 11/2004 | Asano et al. | |
| 2004/0257283 A1* | 12/2004 | Asano | H01Q 1/243 343/702 |
| 2005/0073462 A1 | 4/2005 | Lin | |
| 2005/0128155 A1 | 6/2005 | Fukuda | |
| 2005/0266904 A1 | 12/2005 | Kitaji et al. | |
| 2006/0001582 A1 | 1/2006 | Hayashi | |
| 2006/0017621 A1* | 1/2006 | Okawara | H01Q 1/243 343/700 MS |
| 2006/0109184 A1 | 5/2006 | Chen et al. | |
| 2007/0218853 A1 | 9/2007 | Yu | |
| 2008/0018541 A1 | 1/2008 | Pang et al. | |
| 2008/0150811 A1 | 6/2008 | Honda et al. | |
| 2008/0165063 A1 | 7/2008 | Schlub et al. | |
| 2008/0198087 A1* | 8/2008 | Cheng | H01Q 9/045 343/845 |
| 2008/0316115 A1 | 12/2008 | Hill et al. | |
| 2009/0143040 A1* | 6/2009 | Man | H01Q 1/243 455/274 |
| 2009/0256763 A1* | 10/2009 | Chi | H01Q 9/26 343/741 |
| 2009/0273529 A1* | 11/2009 | Liu | H01Q 1/243 343/725 |
| 2010/0123632 A1 | 5/2010 | Hill et al. | |
| 2011/0014958 A1 | 1/2011 | Black et al. | |
| 2011/0241949 A1 | 10/2011 | Nickel et al. | |
| 2012/0009983 A1 | 1/2012 | Mow et al. | |
| 2012/0112970 A1 | 5/2012 | Caballero et al. | |
| 2012/0115553 A1 | 5/2012 | Mahe et al. | |

FOREIGN PATENT DOCUMENTS

| | | |
|---|---|---|
| CN | 101529657 | 9/2009 |
| CN | 101627537 | 1/2010 |
| CN | 202353552 | 7/2012 |
| EP | 1093098 | 4/2001 |
| EP | 1280230 | 1/2003 |
| EP | 1295358 | 3/2003 |
| EP | 1361623 | 11/2003 |
| EP | 1995889 | 11/2008 |
| JP | 2001185927 | 7/2001 |
| JP | 2001-298378 | 10/2001 |
| JP | 2005175902 | 6/2005 |
| JP | 2005-039696 | 10/2005 |
| JP | 2006-527941 | 12/2006 |
| JP | 2008-153984 | 3/2007 |
| JP | 2008159636 | 7/2008 |
| JP | 4425711 | 3/2010 |
| JP | 2010081098 | 4/2010 |
| JP | 2010-531574 | 9/2010 |
| KR | 10-2009-0029616 | 4/2006 |
| KR | 10-2009-0081415 | 7/2009 |
| TW | 200913370 | 3/2009 |
| WO | 0159945 | 8/2001 |
| WO | 0191234 | 11/2001 |
| WO | 03096474 | 11/2003 |
| WO | 2004102744 | 11/2004 |
| WO | 2004112187 | 12/2004 |
| WO | 2008032263 | 3/2008 |
| WO | 2008-055039 | 5/2008 |
| WO | 2008055039 | 5/2008 |
| WO | 2010025023 | 3/2010 |

\* cited by examiner

|  | 850 | | 900 | | 1800 | | 1900 | | 2100 | |
|---|---|---|---|---|---|---|---|---|---|---|
|  | TX | RX | TX | RX | TX | RX | TX | RX | TX | RX |
| LOWER | Y | Y | Y | Y | Y | Y | Y | Y | Y | Y |
| UPPER M2=MA |  | Y |  |  |  |  |  | Y |  |  |
| UPPER M2=MB |  |  |  | Y |  |  |  |  |  | Y |

ANTENNA SYSTEM WITH RECEIVER DIVERSITY AND TUNABLE MATCHING CIRCUIT

This application is a continuation of U.S. patent application Ser. No. 12/941,010, filed Nov. 5, 2010. This application claims the benefit of and claims priority to U.S. patent application Ser. No. 12/941,010, filed Nov. 5, 2010, which is hereby incorporated by reference herein in its entirety.

BACKGROUND

This relates generally to wireless communications circuitry, and more particularly, to electronic devices that have wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands at 850 MHz, 900 MHz, 1800 MHz, 1900 MHz, and 2100 MHz. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz.

To satisfy consumer demand for small form factor wireless devices, manufacturers are continually striving to implement wireless communications circuitry such as antenna components using compact structures. At the same time, it may be desirable to include conductive structures in an electronic device such as metal device housing components. Because conductive components can affect radio-frequency performance, care must be taken when incorporating antennas into an electronic device that includes conductive structures. Moreover, care must be taken to ensure that the antennas and wireless circuitry in a device are able to operate satisfactorily even in areas of weak radio-frequency signal strength.

It would therefore be desirable to be able to provide improved wireless communications circuitry for wireless electronic devices.

SUMMARY

Electronic devices may be provided that contain wireless communications circuitry. The wireless communications circuitry may include radio-frequency transceiver circuitry and antenna structures. An electronic device may include a display mounted within a housing. A peripheral conductive member may run around the edges of the display and housing.

The peripheral conductive member may be divided into individual segments by forming gaps in the peripheral conductive member at various points along its length. The gaps may be filled with a dielectric such as plastic and may form an open circuit between opposing portions of the conductive member. With one illustrative configuration, three gaps may be formed in the peripheral conductive member to divide the peripheral conductive member into three respective segments.

A conductive housing member such as a conductive midplate member that spans the width of the housing may be connected to the peripheral conductive member at the left and right edges of the display. The conductive housing member and other conductive structures such as electrical components and printed circuits may form a ground plane. The ground plane and the peripheral conductive member segments may surround dielectric openings to form the antenna structures. For example, an upper cellular telephone antenna may be formed at an upper end of the housing and a lower cellular telephone antenna may be formed at a lower end of the housing. In the upper cellular telephone antenna, a first dielectric opening may be surrounded by at least some of a first peripheral conductive member segment and portions of the ground plane. In the lower cellular telephone antenna, a second dielectric opening may be surrounded by at least some of a second peripheral conductive member segment and portions of the ground plane. The upper cellular telephone antenna may be a two-branch inverted-F antenna. The lower cellular telephone antenna may be a loop antenna.

The radio-frequency transceiver circuitry may be coupled to the upper and lower antennas using matching circuits. A fixed matching circuit may be used to couple the radio-frequency transceiver circuitry to the lower antenna. A fixed matching circuit or a tunable matching circuit may be used to couple the radio-frequency transceiver circuitry to the upper antenna.

During operation of the electronic device, the lower antenna may serve as the primary cellular antenna for the device. Radio-frequency antenna signals may be transmitted and received by the lower antenna in cellular telephone bands such as the bands at 850 MHz, 900 MHz, 1800 MHz, 1900 MHz, and 2100 MHz. The upper antenna may serve as a secondary antenna that allows the electronic device to implement receiver diversity. When the performance of the lower antenna drops during operation, the radio-frequency transceiver circuitry in the device can receive signals with the upper antenna rather than the lower antenna.

The upper antenna may support only a subset of the bands that are supported by the lower antenna. For example, the upper antenna may support only two receive sub-bands. If desired, the coverage of the upper antenna can be extended by tuning the matching circuit for the upper antenna in real time. This arrangement may allow the upper antenna to cover first and second receive bands during a first mode of operation and third and fourth receive bands during a second mode of operation.

Further features of the invention, its nature and various advantages will be more apparent from the accompanying drawings and the following detailed description of the preferred embodiments.

BRIEF DESCRIPTION OF THE DRAWINGS

FIG. 7 is a chart showing how antennas of the type shown in FIG. 6 may be used in covering communications bands of interest by tuning a matching filter of the type shown in FIG. 5 in accordance with an embodiment of the present invention.

DETAILED DESCRIPTION

Electronic devices may be provided with wireless communications circuitry. The wireless communications circuitry may be used to support wireless communications in multiple wireless communications bands. The wireless communications circuitry may include one or more antennas.

The antennas can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures. The conductive electronic device structures may include conductive housing structures. The housing structures may include a peripheral conductive member that runs around the periphery of an electronic device. The peripheral conductive member may serve as a bezel for a planar structure such as a display, may serve as sidewall structures for a device housing, or may form other housing structures. Gaps in the peripheral conductive member may be associated with the antennas.

Figure 1:
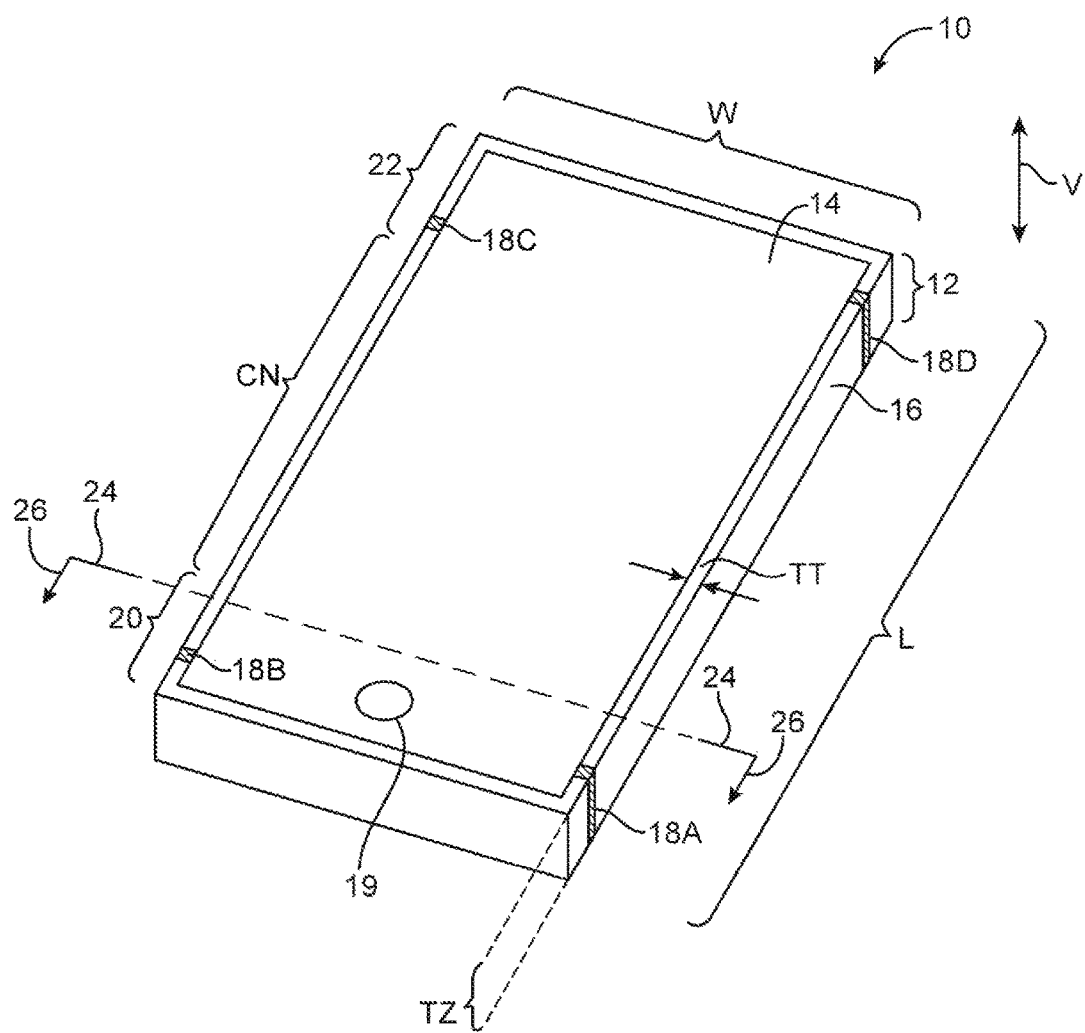
FIG. 1 is a perspective view of an illustrative electronic device with wireless communications circuitry in accordance with an embodiment of the present invention.

An illustrative electronic device of the type that may be provided with one or more antennas is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electronic ink elements, liquid crystal display (LCD) components, or other suitable image pixel structures. A cover glass layer may cover the surface of display 14. Buttons such as button 19 may pass through openings in the cover glass.

Housing 12 may include structures such as peripheral member 16. Member 16 may run around the rectangular periphery of device 10 and display 14. Member 16 or part of member 16 may serve as a bezel for display 14 (e.g., a cosmetic trim that surrounds all four sides of display 14 and/or helps hold display 14 to device 10). Member 16 may also, if desired, form sidewall structures for device 10.

Member 16 may be formed of a conductive material and may therefore sometimes be referred to as a peripheral conductive member or conductive housing structures. Member 16 may be formed from a metal such as stainless steel, aluminum, or other suitable materials. One, two, or more than two separate structures may be used in forming member 16. In a typical configuration, member 16 may have a thickness (dimension TT) of about 0.1 mm to 3 mm (as an example). The sidewall portions of member 16 may, as an example, be substantially vertical (parallel to vertical axis V). Parallel to axis V, member 16 may have a dimension TZ of about 1 mm to 2 cm (as an example). The aspect ratio R of member 16 (i.e., the ratio R of TZ to TT) is typically more than 1 (i.e., R may be greater than or equal to 1, greater than or equal to 2, greater than or equal to 4, greater than or equal to 10, etc.).

It is not necessary for member 16 to have a uniform cross-section. For example, the top portion of member 16 may, if desired, nave an inwardly protruding lip that helps hold display 14 in place. If desired, the bottom portion of member 16 may also have an enlarged lip (e.g., in the plane of the rear surface of device 10). In the example of FIG. 1, member 16 has substantially straight vertical sidewalls. This is merely illustrative. The sidewalls of member 16 may be curved or may have any other suitable shape. In some configurations (e.g., when member 16 serves as a bezel for display 14), member 16 may run around the lip of housing 12 (i.e., member 16 may cover only the edge of housing 12 that surrounds display 14 and not the rear edge of housing 12 of the sidewalls of housing 12).

Display 14 may include conductive structures such as an array of capacitive electrodes, conductive lines for addressing pixel elements, driver circuits, etc. Housing 12 also include internal structures such as metal frame members, a planar housing member (sometimes referred to as a midplate) that spans the walls of housing 12 (i.e., a substantially rectangular member that is welded or otherwise connected between opposing sides of member 16), printed circuit boards, and other internal conductive structures. These conductive structures may be located in center CN of housing 12 (as an example).

In regions 22 and 20, openings may be formed between the conductive housing structures and conductive electrical components that make up device 10. These openings may be filled with air, plastic, or other dielectrics. Conductive housing structures and other conductive structures in region CN of device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, or may otherwise serve as part of antenna structures formed in regions 20 and 22.

Portions of member 16 may be provided with gap structures. For example, member 16 may be provided with one or more gaps such as gaps 18A, 18B, 18C, and 18D, as shown in FIG. 1. The gaps may be filled with dielectric such as polymer, ceramic, glass, etc. Gaps 18A, 18B, 18C, and 18D may divide member 16 into one or more peripheral conductive member segments. There may be, for example, two segments of member 16 (e.g., in an arrangement with two gaps), three segments of member 16 (e.g., in an arrangement with three gaps), four segments of member 16 (e.g., in an arrangement with four gaps, etc.). The segments of peripheral conductive member 16 that are formed in this way may form parts of antennas in device 10.

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover separate communications bands of interest or may be used together to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
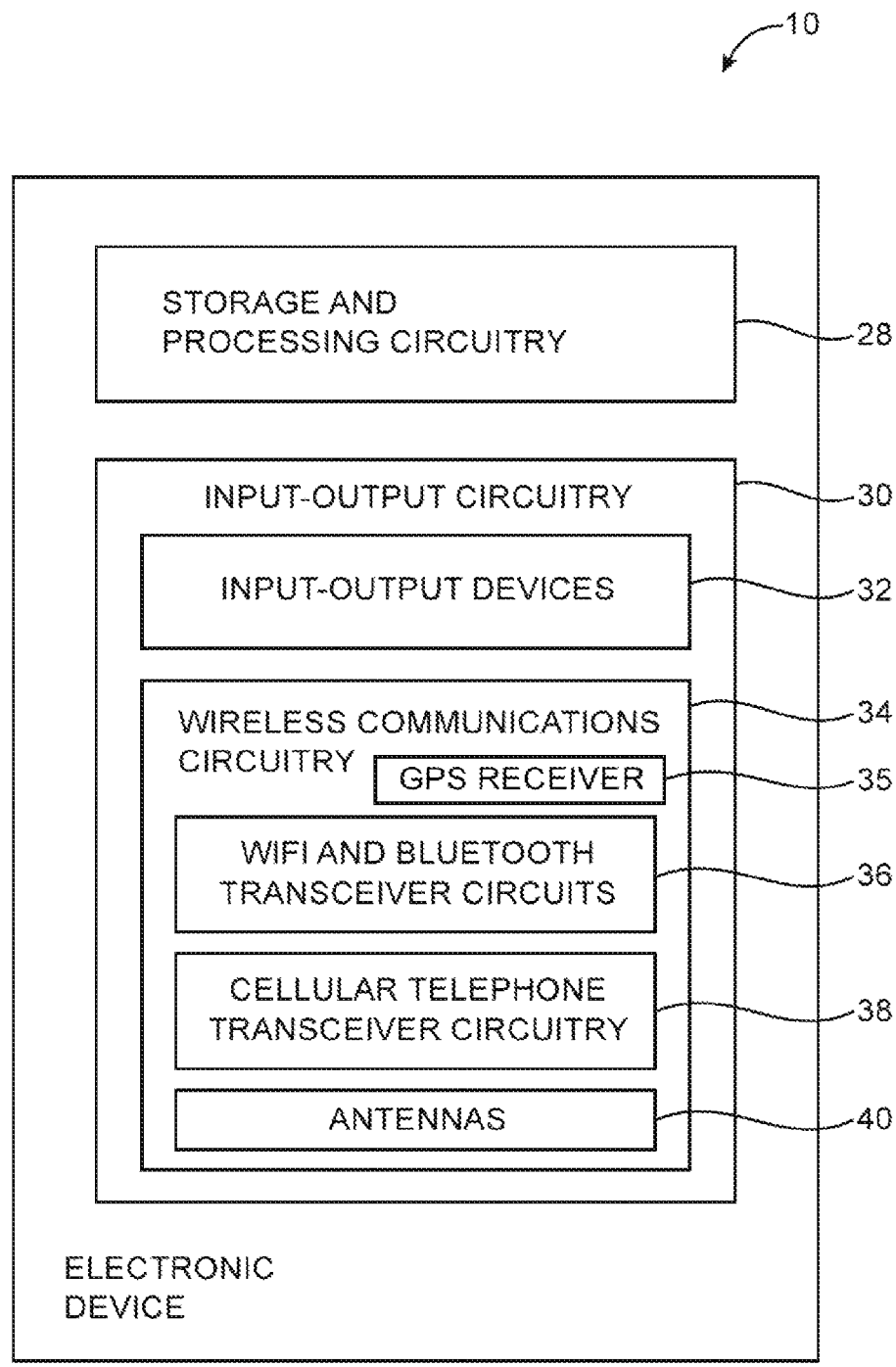
FIG. 2 is a schematic diagram of an illustrative electronic device with wireless communications circuitry in accordance with an embodiment of the present invention.

A schematic diagram of electronic device 10 is shown in FIG. 2. As shown in FIG. 2, electronic device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas in device 10. For example, to support antenna diversity schemes and MIMO schemes or other multi-antenna schemes, circuitry 28 may perform signal quality monitoring operations, sensor monitoring operations, and other data gathering operations and may, in response to the gathered data, control which antenna structures within device 10 are being used to receive and process data. As an example, circuitry 28 may control which of two or more antennas is being used to receive incoming radio-frequency signals, may control which of two or more antennas is being used to transmit radio-frequency signals, may control the process of routing incoming data streams over two or more antennas in device 10 in parallel, etc. In performing these control operations, circuitry 28 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 850 MHz, 900 MHz, 1800 MHz, 1900 MHz, and 2100 MHz or other cellular telephone bands of interest. Wireless communications circuitry 34 can include circuitry for other short-range and long-range wireless links if desired. For example, wireless communications circuitry 34 may include global positioning system (GPS) receiver equipment, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link.

Figure 3:
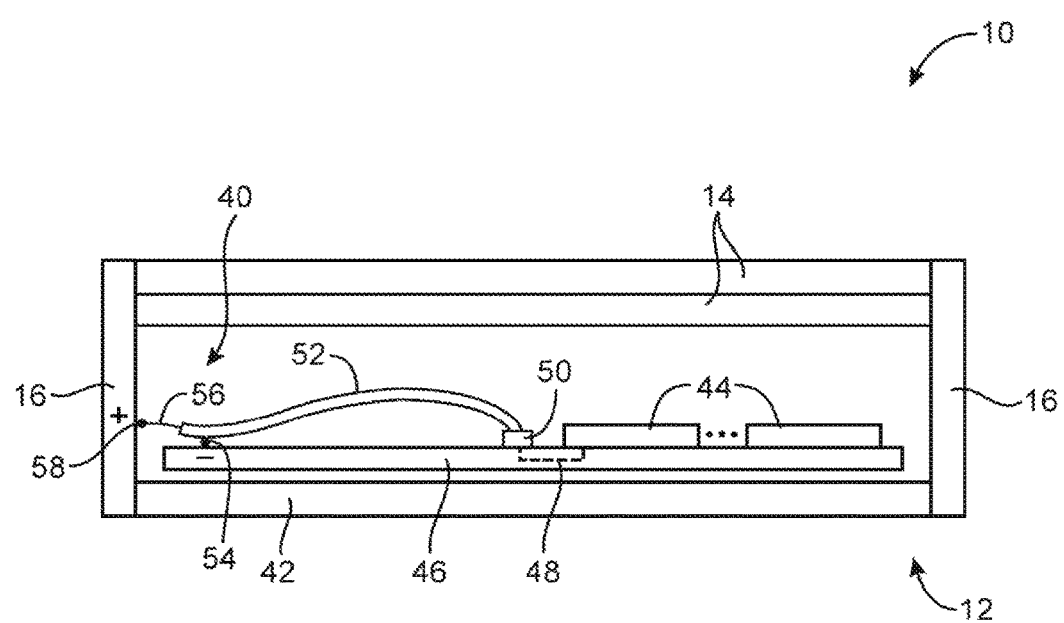
FIG. 3 is a cross-sectional end view of an illustrative electronic device with wireless communications circuitry in accordance with an embodiment of the present invention.

A cross-sectional side view of device 10 of FIG. 1 taken along line 24-24 in FIG. 1 and viewed in direction 26 is shown in FIG. 3. As shown in FIG. 3, display 14 may be mounted to the front surface of device 10. Housing 12 may include sidewalls formed from member 16 and one or more rear walls formed from structures such as planar rear housing structure 42. Structure 42 may be formed from a dielectric such as glass, ceramic, or plastic, and/or metals or other suitable materials (e.g., fiber composites). Snaps, clips, screws, adhesive, and other structures may be used in assembling the parts of housing 12 together.

Device 10 may contain printed circuit boards such as printed circuit board 46. Printed circuit board 46 and the other printed circuit boards in device 10 may be formed from rigid printed circuit board material (e.g., fiberglass-filled epoxy) or flexible sheets of material such as polymers. Flexible printed circuit boards ("flex circuits") may, for example, be formed from flexible sheets of polyimide.

Printed circuit board 46 may contain interconnects such as interconnects 48. Interconnects 48 may be formed from conductive traces (e.g., traces of gold-plated copper or other metals). Connectors such as connector 50 may be connected to interconnects 48 using solder or conductive adhesive (as examples). Integrated circuits, discrete components such as resistors, capacitors, and inductors, and other electronic components may be mounted to printed circuit board 46.

Antennas in device 10 such as illustrative antenna 40 of FIG. 3 may have antenna feed terminals. For example, each antenna in device 10 may have a positive antenna feed terminal such as positive antenna feed terminal 58 and a ground antenna feed terminal such as ground antenna feed terminal 54. As shown in the illustrative arrangement of FIG. 3, a transmission line path such as coaxial cable 52 may be coupled between the antenna feed formed from terminals 58 and 54 and transceiver circuitry in components 44 via connector 50 and interconnects 48. Components 44 may include one or more integrated circuits for implementing wireless circuitry 34 of FIG. 2 (e.g., receiver 35 and transceiver circuits 36 and 38).

Connectors such as connector 50 may be used in coupling transmission lines in device 10 to printed circuit boards such as board 46. Connector 50 may be, for example, a coaxial cable connector that is connected to printed circuit board 46 using solder (as an example). Cable 52 may be a coaxial cable or other transmission line. Examples of transmission lines that may be used in device 10 include coaxial cables, microstrip and stripline transmission lines formed from a flex circuit or rigid printed circuit board, transmission lines that are formed from multiple transmission line structures such as these, etc.

When coupled to the feed of antenna 40, transmission line 52 may be used to transmit and receive radio-frequency signals using antenna 40. As shown in FIG. 3, terminal 58 may be coupled to coaxial cable center connector 56. Terminal 54 may be connected to a ground conductor in cable 52 (e.g., a conductive outer braid conductor). Other arrangements may be used for coupling transceivers in device 10 to antenna 40 if desired. For example, impedance matching circuits may be used in coupling transceiver circuitry to antenna structures. The arrangement of FIG. 3 is merely illustrative.

In the illustrative example of FIG. 3, device 10 includes antenna 40. To enhance signal quality and to cover multiple bands of interest, device 10 may contain multiple antennas. With one suitable arrangement, which is sometimes described herein as an example, a WiFi® antenna may be located in region 22, a first (e.g., a primary) cellular telephone antenna may be located in region 20, and a second (e.g., secondary) cellular telephone antenna may be located in region 22. The second cellular telephone antenna may, if desired, be configured to receive GPS signals. Illustrative wireless circuitry 34 that includes an antenna arrangement of this type is shown in FIG. 4.

Figure 4:
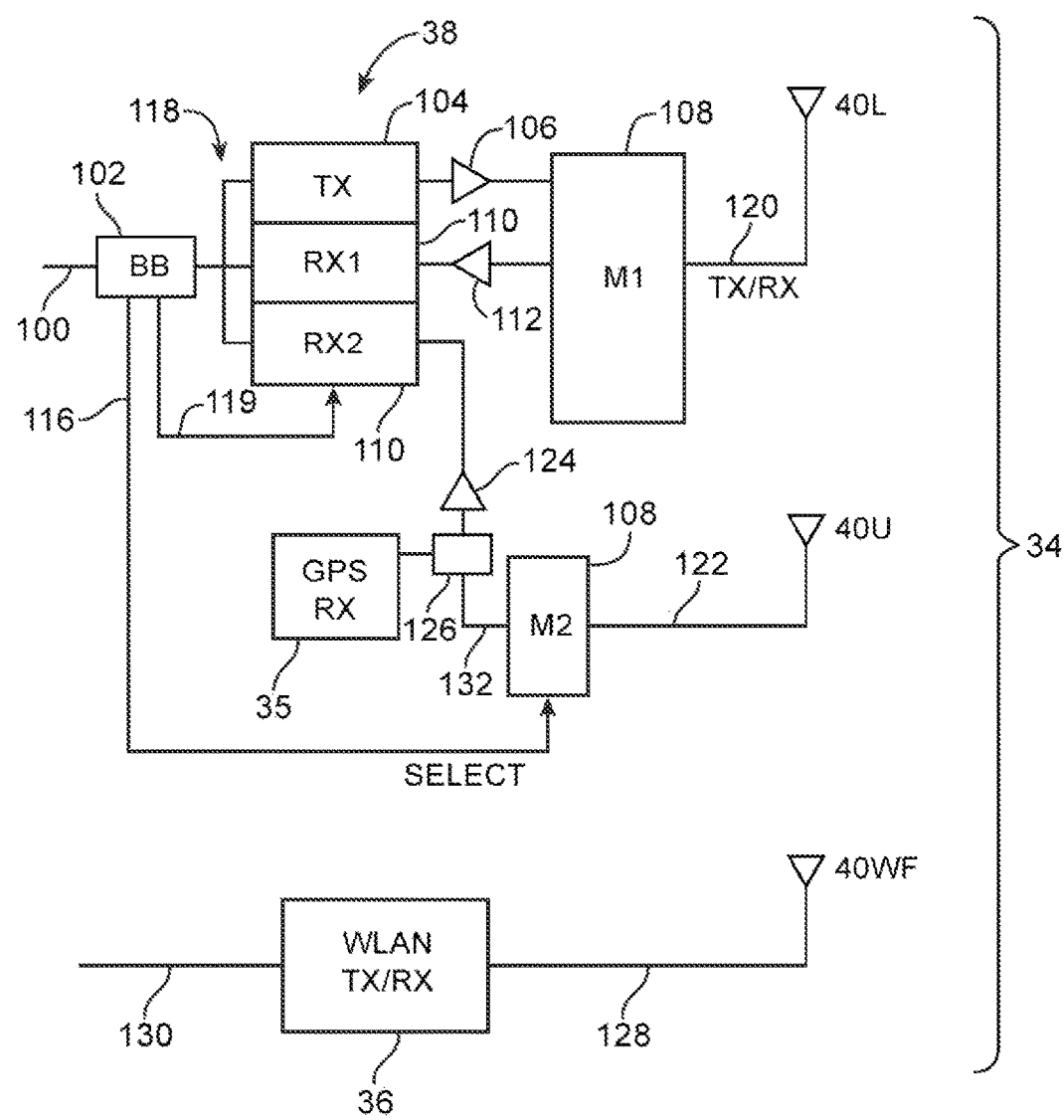
FIG. 4 is a diagram of illustrative wireless circuitry including multiple antennas in accordance with an embodiment of the present invention.

As shown in FIG. 4, wireless circuitry 34 may have input-output ports such as ports 100 and 130 for interfacing with digital data circuits in storage and processing circuitry 28. Wireless circuitry 34 may include one or more integrated circuits for implementing transceiver circuits such as baseband processor 102 and cellular telephone transceiver circuitry 38. Port 100 may receive digital data from storage and processing circuitry 28 for transmission over antenna 40L. Incoming data that has been received by antennas 40U and 40L, cellular transceiver circuitry 38, and baseband processor 102 may be supplied to storage and processing circuitry 28 via port 100. Port 130 may be used to handle digital data associated with transmitted and received wireless local area network signals such as WiFi® signals (as an example). Outgoing digital data that is supplied to port 130 by storage and processing circuitry 28 may be transmitted using wireless local area network transceiver circuitry 36, paths such as path 128, and one or more antennas such as antenna 40WF. During data reception operations, signals received by antenna 40WF may be provided to transceiver 36 via path 128. Transceiver 36 may convert the incoming signals to digital data. The digital data may be provided to storage and processing circuitry 28 via port 130. If desired, local signals such as Bluetooth® signals may also be transmitted and received via antennas such as antenna 40WF.

Transceiver circuitry 38 may include one or more transmitters and one or more receivers. In the example of FIG. 4, transceiver circuitry 38 includes radio-frequency transmitter 104 and radio-frequency receivers 110. Transmitter 104 and receivers 110 (i.e., receiver RX1 and receiver RX2) may be used to handle cellular telephone communications. Signals that are received by transmitter 104 over path 118 may be supplied to power amplifier 106 by transmitter 104. Power amplifier 106 may strengthen these outgoing signals for transmission over antenna 40L. Incoming signals that are received by antenna 40L may be amplified by low noise amplifier 112 and provided to receiver RX1. Receiver RX1 may provide data received from antenna 40U to processor 102 via path 118. Incoming signals that are received by antenna 40U may be amplified by low noise amplifier 124 and provided to receiver RX2 (or to RX1 using a switch). Receiver RX2 may provide data received from antenna 40L to processor 102 via path 118. Circuits such as transmitter 104 and receivers 110 may each have multiple ports (e.g., for handling different respective communications bands) and may be implemented using one or more individual integrated circuits.

Antennas 40U and 40L may be coupled to transceiver circuitry 38 using circuitry such as impedance matching circuitry, filters, and switches. This circuitry, which is sometimes referred to as front-end module (FEM) circuitry, can be controlled by storage and processing circuitry in device 10 (e.g., control signals from a processor such as baseband processor 102). As shown in the example of FIG. 4, the front-end circuitry in wireless circuitry 34 may include impedance matching circuitry 108 such as matching circuit M1 and matching circuit M2. Impedance matching circuitry 108 may be formed using conductive structures with associated capacitance, resistance, and inductance values, and/or discrete components such as inductors, capacitors, and resistors that form circuits to match the impedances of transceiver circuitry 38 and antennas 40U and 40L. Matching circuit M1 may be coupled between wireless transceiver circuitry 38 (including associated amplifier circuitry 106 and 112) and antenna 40L. Matching circuit M2 may be coupled between transceiver circuitry 38 (and associated amplifier 124) and antenna 40U using paths such as paths 132 and 122.

Matching circuits M1 and M2 may be fixed or adjustable. For example, matching circuit M1 may be fixed and matching circuit M2 may be adjustable. In this type of configuration, a control circuit such as baseband processor 102 may issue control signals such as signal SELECT on path 116 of wireless circuitry 34. Signal SELECT may be distributed to matching circuit M2. When SELECT has a first value, matching circuit M2 may be placed in a first configuration. When SELECT has a second value, matching circuit M2 may be placed in a second configuration. The state of matching circuit M2 may serve to tune antenna 40U so that different communications bands are covered by antenna 40U. By using an antenna tuning scheme of this type, antenna 40U may be able to cover a wider range of communications frequencies than would otherwise be possible. The use of tuning for antenna 40U may allow a relatively narrow bandwidth (and potentially compact) design to be used for antenna 40U, if desired.

Control signals may be provided to receiver circuitry 110 over path 119 so that wireless circuitry 34 can selectively activate one or both of receivers RX1 and RX2 or can otherwise select which antenna signals are being received in real time (e.g., by controlling a multiplexer in circuitry 34 that routes signals from a selected one of the antennas to a shared receiver so that the receiver can be shared between antennas). For example, baseband processor 102 or other storage and processing circuitry in device 10 can monitor signal quality (bit error rate, signal-to-noise ratio, frame error rate, signal power, etc.) for signals being received by antennas 40U and 40L. Based on real-time signal quality information or other data (e.g., sensor data indicating that a particular antenna is blocked), signals on path 119 or other suitable control signals can be adjusted so that optimum receiver circuitry (e.g., receiver RX1 or RX2) is used to receive the incoming signals. Antenna diversity schemes such as this in which circuitry 34 selects an optimum antenna and receiver no use in real time based on signal quality measurements or other information while transmitted signals are transmitted by a fixed antenna and transmitter (i.e., antenna 40L and transmitter 104) may sometimes be referred to as receiver diversity schemes.

In a receiver diversity configuration (i.e., in a device without transmitter diversity), the radio-frequency transmitter circuitry in a device is configured to receive signals through two or more different antennas, so that an optimum antenna can be chosen in real time to enhance signal reception, whereas the radio-frequency transceiver circuitry is configured to transmit signals through only a single one of the antennas and not others. If desired, wireless circuitry 34 may be configured to implement both receiver and transmitter diversity and/or may be configured to handle multiple simultaneous data streams (e.g., using a MIMO arrangement). The use of wireless circuitry 34 to implement a receiver diversity scheme while using a dedicated antenna for handling transmitted signals is merely illustrative.

As shown in FIG. 4, wireless circuitry 34 may be provided with filter circuitry such as filter circuitry 126. Circuitry 126 may route signals by frequency, so that cellular telephone signals are conveyed between antenna 40U and receiver RX2, whereas GPS signals that are received by antenna 40U are routed to GPS receiver 35.

Figure 5:
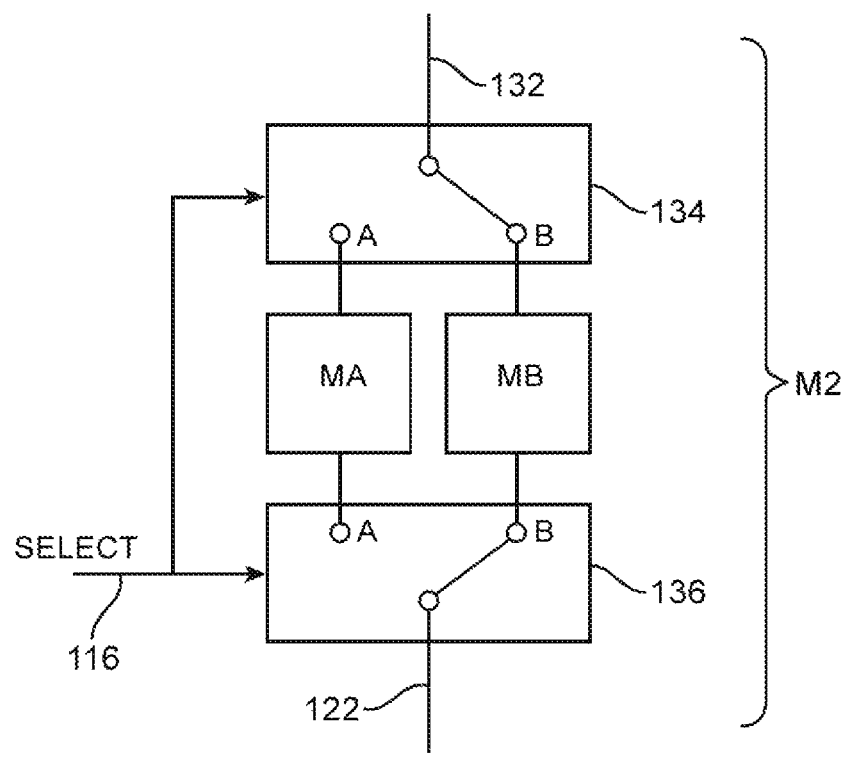
FIG. 5 is a circuit diagram of an illustrative tunable matching circuit of the type that may be used in connection with the wireless circuitry of FIG. 4 in accordance with an embodiment of the present invention.

Illustrative tunable circuitry that may be used for implementing matching circuit M2 of FIG. 4 is shown in FIG. 5. As shown in FIG. 5, matching circuit M2 may have switches such as switches 134 and 136. Switches 134 and 136 may have multiple positions (shown by the illustrative A and B positions in FIG. 5). When signal SELECT has a first value, switches 134 and 136 may be put in their A positions and matching circuit MA may be switched into use. When signal SELECT has a second value, switches 134 and 136 may be placed in their B positions (as shown in FIG. 5), so that matching circuit MB is connected between paths 132 and 122.

Figure 6:
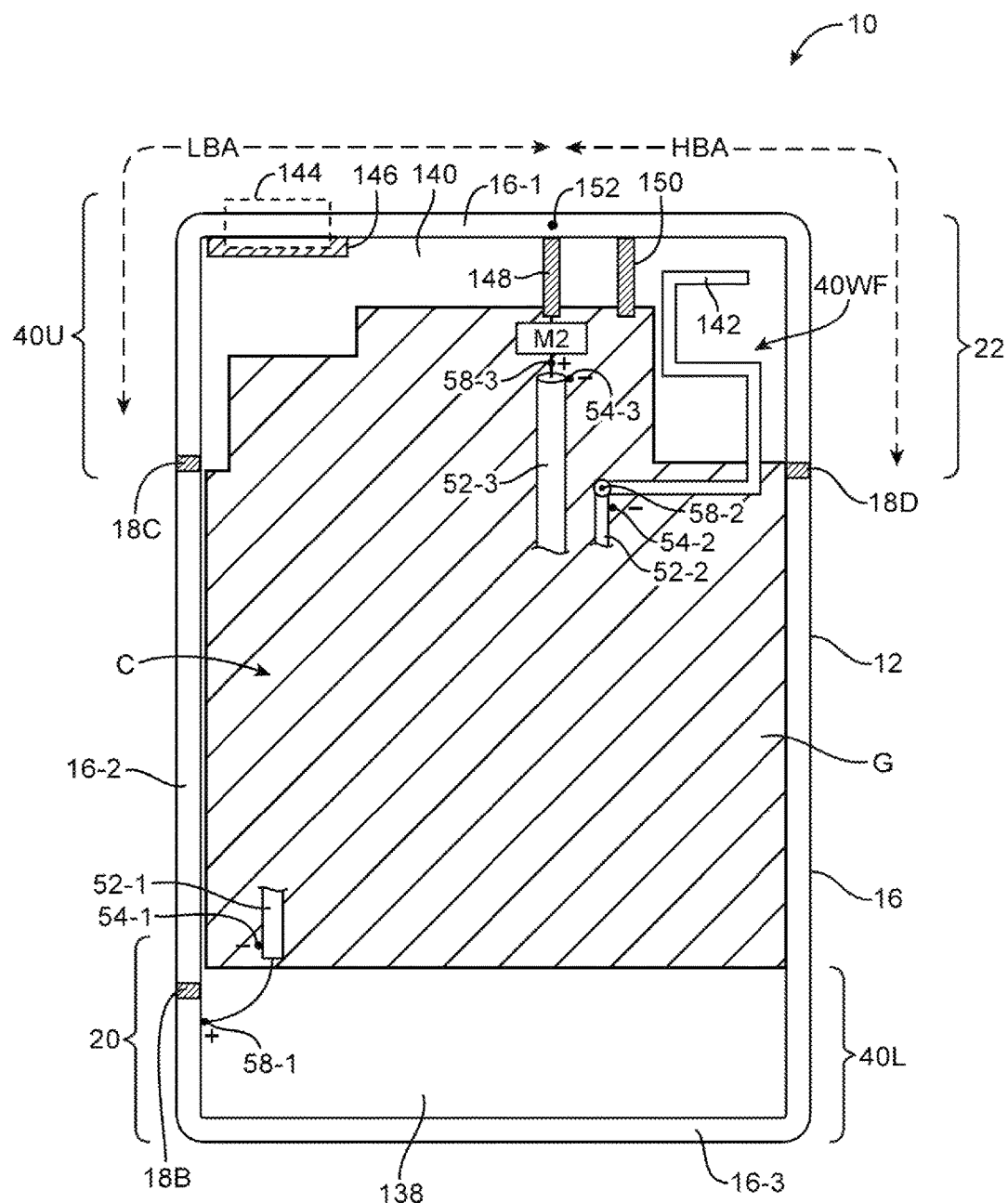
FIG. 6 is a diagram of an electronic device of the type shown in FIG. 1 showing how antennas may be formed within the device in accordance with an embodiment of the present invention.

FIG. 6 is a top view of the interior of device 10 showing how antennas 40L, 40U, and 40WF may be implemented within housing 12. As shown in FIG. 6, ground plane G may be formed within housing 12. Ground plane G may form antenna ground for antennas 40L, 40U, and 40WF. Because ground plane G may serve as antenna ground, ground plane G may sometimes be referred to as antenna ground, ground, or a ground plane element (as examples).

In central portion C of device 10, ground plane G may be formed by conductive structures such as a conductive housing midplate member that is connected between the left and right edges of member 16, printed circuit boards with conductive ground traces, etc. At ends 22 and 20 of device 10, the shape of ground plane G may be determined by the shapes and locations of conductive structures that are tied to ground. Examples of conductive structures that may overlap to form ground plane G include housing structures (e.g., a conductive housing midplate structure, which may have protruding portions), conductive components (e.g., switches, cameras, data connectors, printed circuits such as flex circuits and rigid printed circuit boards, radio-frequency shielding cans, buttons such as button 144 and conductive button mounting structure 146), and other conductive structures in device 10. In the illustrative layout of FIG. 6, the portions of device 10 that are conductive and tied to ground to form part of ground plane G are shaded and are contiguous with central portion C.

Openings such as openings 138 and 146 may be formed between ground plane G and respective portions of peripheral conductive member 16. Openings 138 and 146 may be filled with air, plastic, and other dielectrics. Openings 138 and 146 may be associated with antenna structures 40.

Lower antenna 40L may be formed by a loop antenna structure having a shape that is determined at least partly by the shape of the lower portions of ground plane G and conductive housing member 16. In the example of FIG. 6, opening 138 is depicted as being rectangular, but this is merely illustrative. In practice, the shape of opening 138 may be dictated by the placement of conductive structures in region 20 such as a microphone, flex circuit traces, a data port connector, buttons, a speaker, etc.

Lower antenna 40L may be fed using an antenna feed made up of positive antenna feed terminal 58-1 and ground antenna feed terminal 54-1. Transmission line 52-1 (see, e.g., path 122 of FIG. 4) may be coupled to the antenna feed for lower antenna 40L. Gap 18B may form a capacitance that helps configure the frequency response of antenna 40L. If desired, device 10 may have conductive housing portions, matching circuit elements, and other structures and components that help match the impedance of transmission line 52-1 to antenna 40L (see, e.g., illustrative matching circuit M1 of FIG. 4).

Antenna 40WF may have an antenna resonating element formed from a strip of conductor such as strip 142. Strip 142 may be formed from a trace on a flex circuit, from a trace on a rigid printed circuit board, from a strip of metal foil, or from other conductive structures. Antenna 40WF may be fed by transmission line 52-2 (see, e.g., path 128 of FIG. 4) using antenna feed terminals 58-2 and 54-2.

Antenna 40U may be a two-branch inverted-F antenna. Transmission line 52-3 (see, e.g., path 120 of FIG. 4) may be used to feed antenna 40U at antenna feed terminals 58-3 and 54-3. Conductive structure 150 may be bridge dielectric opening 140 and may be used to electrically short ground plane G to peripheral housing member 16. Conductive structure 148 and matching circuit M2 may be used to connect antenna feed terminal 58-3 to peripheral conductive member 16 at point 152. Conductive structures such as structures 148 and 150 may be formed by flex circuit traces, conductive housing structures, springs, screws, or other conductive structures.

Gaps such as gaps 18B, 18C, and 18D may be present in peripheral conductive member 16. (Gap 18A of FIG. 1 may be absent or may be implemented using a phantom gap structure that cosmetically looks like a gap from the exterior of device 10, but that is electrically shorted within the interior of housing 12 so that no gap is electrically present in the location of gap 18A.) The presence of gaps 18B, 18C, and 18D may divide peripheral conductive member 16 into segments. As shown in FIG. 6, peripheral conductive member 16 may include first segment 16-1, second segment 16-2, and third segment 16-3.

Segment 16-1 may form antenna resonating element arms for antenna 40U. In particular, a first portion (segment) of segment 16-1 (having arm length LBA) may extend from point 152 (where segment 16-1 is fed) to the end of segment 16-1 that is defined by gap 18C and a second portion (segment) of segment 16-1 (having arm length HBA) may extend from point 152 to the opposing end of segment 16-1 that is defined by gap 18D. The first and second portions of segment 16-1 may form respective branches of an inverted F antenna and may be associated with respective low band (LB) and high band (HB) antenna resonances for antenna 40U.

Antenna 40L may cover the transmit and receive subbands in five communications bands (e.g., 850 MHz, 900 MHz, 1800 MHz, 1900 MHz, and 2100 MHz), as shown in the table of FIG. 7. Antenna 40U may be configured to cover a subset of these five illustrative communications bands. For example, antenna 40U may be configured to cover a two receive bands of interest and, with tuning, four receive bands of interest.

In arrangements in which matching circuit M2 is fixed, for example, antenna 40U may be configured to cover receive bands 850 RX (the 850 MHz receive band) and 1900 RX (the 1900 MHz receive band), may be configured to cover receive bands 900 RX (the 900 MHz receive band) and 2100 RX (the 2100 MHz receive band), or may be configured to cover any other suitable pair or set of these bands.

In arrangements in which matching circuit M2 is adjustable, antenna 40U may be tuned to cover all four of these receive bands. In particular, M2 can be placed in state MA to configure antenna 40U to cover the 850 RX and 1900 RX communications bands and can be placed in state MB to configure antenna 40U to cover the 900 RX and 2100 RX communications bands.

Figure 8:
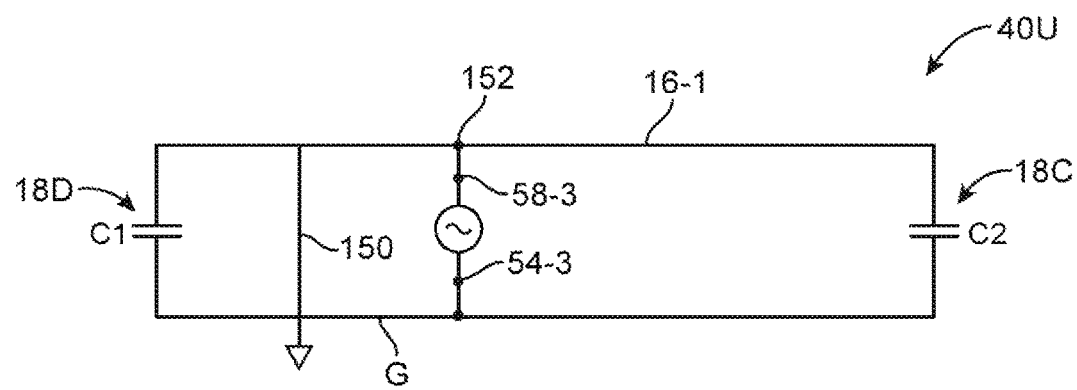
FIG. 8 is a diagram of an antenna of the type shown in the upper portion of the device of FIG. 6 in accordance with an embodiment of the present invention.

FIG. 8 is a circuit diagram of antenna 40U. As shown in FIG. 8, gaps 18C and 18D may be associated with respective capacitances C2 and C1. Ground plane G may form antenna ground. Short circuit branch 150 may form a stub that connects peripheral conductive member segment 15-1 to ground G to facilitate impedance matching between the antenna feed (formed form feed terminals 58-3 and 54-3) and antenna 40U.

Figure 9:
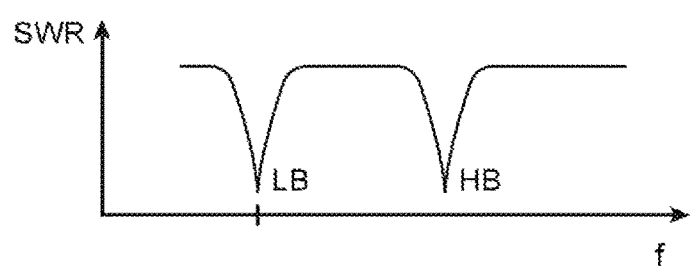
FIG. 9 is a graph showing how an antenna of the type shown in FIG. 8 may exhibit high band and low band resonance peaks in accordance with an embodiment of the present invention.

The graph of FIG. 9 characterizes the performance of antenna 40U by plotting standing wave ratio (SWF) values as a function of antenna operating frequency f. As shown in FIG. 9, there may be two resonances associated with antenna 40U of FIG. 8—low band LB and high band HB. The values of the frequency ranges covered by bands LB and HB depend on the configuration of antenna 40U. With one suitable arrangement, band LB corresponds to a band such as the 850 RX band or the 900 RX band (as examples) and band HB corresponds to a band such as the 1900 RX or 2100 RX band (as examples).

Figure 10:
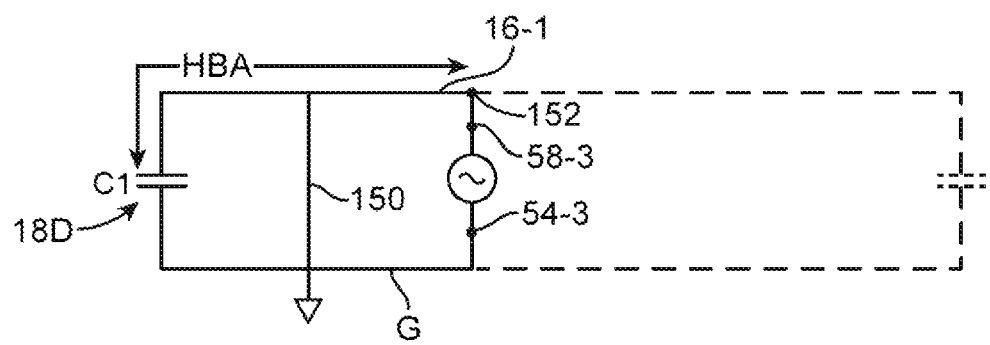
FIG. 10 is a diagram highlighting a high band portion of the antenna diagram of FIG. 8.
Figure 11:
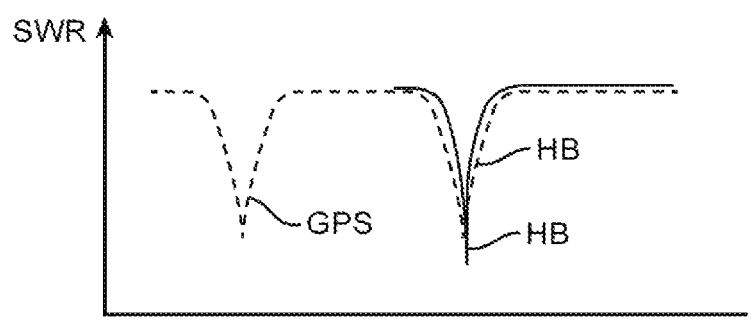
FIG. 11 is a graph showing how the high band antenna structures of FIG. 10 may resonant at communications frequencies associated with a high band and, with the inclusion of matching circuitry, in a Global Positioning System (GPS) band in accordance with an embodiment of the present invention.

FIG. 10 shows the portion of antenna 40U that contributes to antenna coverage in band HB (where inactive portions of the antenna are depicted using dashed lines). FIG. 11 includes an illustrative SWR plot for the portion of antenna 40U that is shown in FIG. 10. The solid line in FIG. 11 corresponds to the performance of the FIG. 10 circuitry in the absence of matching circuit M2. The dashed line in FIG. 11 shows how a GPS resonance (e.g., at 1575 MHz) may be associated with the response of antenna 40U when matching circuit M2 is present. The frequency range of band HB may coincide with band 1900 RX or band 2100 RX, as described in connection with FIG. 7.

Figure 12:
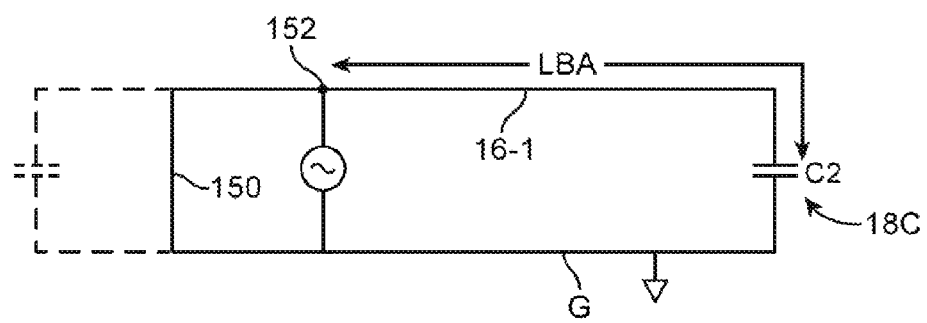
FIG. 12 is a diagram highlighting a low band portion of the antenna diagram of FIG. 8.
Figure 13:
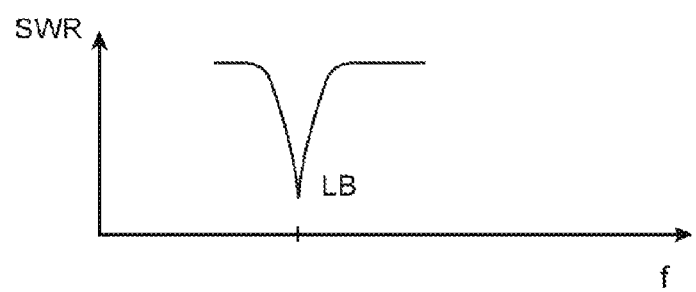
FIG. 13 is a graph showing how the low band antenna structures of FIG. 12 may resonant at communications frequencies associated with a low band in accordance with an embodiment of the present invention.

FIG. 12 shows the portion of antenna 40U that contributes to antenna coverage in band LB (where inactive portions of the antenna are depicted using dashed lines). FIG. 13 includes an illustrative SWR plot for the portion of antenna 40U that is shown in FIG. 12. The frequency range of band LB may coincide with band 850 RX or band 900 RX, as described in connection with FIG. 7.

Figure 14:
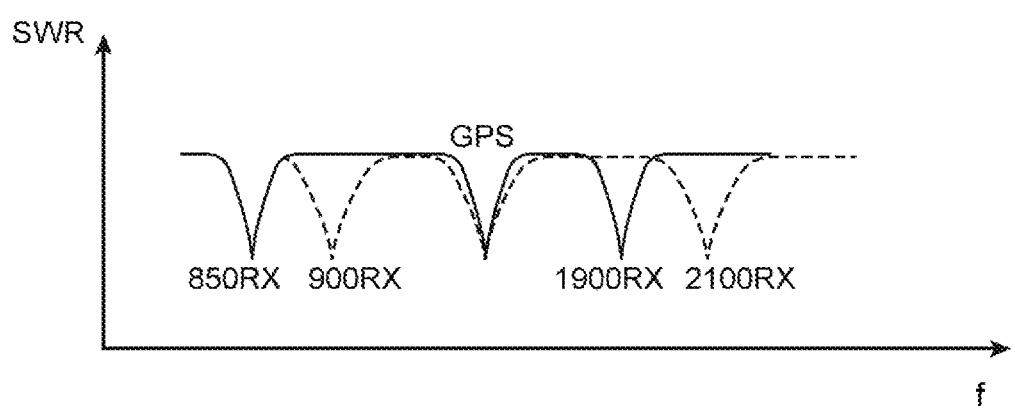
FIG. 14 is a graph showing how the high band and low band portions of the antenna of FIG. 8 may be used to cover multiple communications bands of interest using a tunable matching circuit in accordance with an embodiment of the present invention.

FIG. 14 includes an illustrative SWR plot for antenna 40U of FIG. 8 (e.g., antenna 40U of FIG. 6). The solid line in FIG. 14 corresponds to the response of antenna 40U when matching circuit M2 is in its "MA" configuration. In the MA configuration, antenna 40U can cover receive bands 850 RX and 1900 RX and the GPS band at 1575 MHz. When signal SELECT is adjusted to place matching circuit M2 in its "MB" configuration, antenna 40U may be characterized by the dashed line of FIG. 14. In the MB configuration, antenna 40U can cover receive bands 900 RX and 1900 RX while still covering the GPS band at 1575 MHz (i.e., because the frequency response of antenna 40U is not shifted substantially in the vicinity of 1575 MHz as a function of the state of matching circuit M2).

The foregoing is merely illustrative of the principles of this invention and various modifications can be made by those skilled in the art without departing from the scope and spirit of the invention.

What is claimed is:

1. An electronic device, comprising:
   a housing having conductive structures that form an antenna ground and having peripheral conductive housing structures that run around at least some edges of the housing;
   radio-frequency receiver circuitry;
   an inverted-F antenna that is formed from the antenna ground and an inverted-F antenna resonating element that is separated from the antenna ground by an opening, wherein the inverted-F antenna resonating element is formed from a segment of the peripheral conductive housing structures that is located between first and second gaps in the peripheral conductive housing structures, a first antenna feed terminal is coupled to the segment, and a second antenna feed terminal is coupled to the antenna ground; and
   an additional antenna, wherein the additional antenna is configured to transmit and receive radio-frequency signals in a plurality of cellular telephone bands, and wherein the receiver circuitry is configured to only receive radio-frequency signals in a subset of the plurality of cellular telephone bands over the inverted-F antenna.

2. The electronic device defined in claim 1, further comprising an antenna feed line that is coupled to the first and second antenna feed terminals and that carries antenna signals to the segment.

3. The electronic device defined in claim 2, wherein the additional antenna is formed from the antenna ground and an additional segment of the peripheral conductive housing structures.

4. The electronic device defined in claim 3, further comprising an additional antenna feed line that carries additional antenna signals to the additional segment.

5. The electronic device defined in claim 4, further comprising an impedance matching circuit interposed on the antenna feed line and an adjustable impedance matching circuit interposed on the additional antenna feed line.

6. The electronic device defined in claim 1, wherein the first and second gaps are formed at opposing ends of the segment.

7. The electronic device defined in claim 6, wherein the first and second gaps extend from an external rear surface of the electronic device to an external front surface of the electronic device.

8. The electronic device defined in claim 1, wherein the segment of the peripheral conductive housing structures comprise an external surface of the electronic device.

9. The electronic device defined in claim 1, wherein the segment of the peripheral conductive housing structures and the antenna ground surround a dielectric opening, the electronic device further comprising a conductive structure that bridges the dielectric opening and shorts the peripheral conductive housing structures to the ground.

10. An electronic device, comprising:
    a housing having opposing first and second ends;
    a display mounted within the housing, wherein the display has four edges;
    peripheral conductive housing structures that run along the four edges of the display;
    an antenna ground that is formed at least partly from conductive portions of the housing;
    a first antenna that is formed from an antenna resonating element and the antenna ground, wherein the antenna resonating element is formed from a first segment of the peripheral conductive housing structures and is separated from the antenna ground by an opening, a first antenna feed terminal for the first antenna is coupled to the first segment, and a second antenna feed terminal for the first antenna is coupled to the antenna ground;
    a second antenna having an antenna resonating element that is formed from a second segment of the peripheral conductive housing structures and the antenna ground, wherein a first antenna feed terminal for the second antenna is coupled to the second segment and a second antenna feed terminal for the second antenna is coupled to the antenna ground;
    radio-frequency transceiver circuitry that transmits and receives radio-frequency antenna signals through the second antenna in a plurality of cellular telephone communications bands and that only receives radio-frequency antenna signals through the first antenna in a subset of the cellular telephone communications bands.

11. The electronic device defined in claim 10, wherein the radio-frequency transceiver circuitry is configured to receive the radio-frequency antenna signals in at least five cellular telephone receive bands via the second antenna, is configured to transmit the radio-frequency antenna signals in at least five cellular telephone transmit bands via the second antenna, and is configured to receive the radio-frequency antenna signals in no more than four of the five cellular telephone receive bands via the first antenna.

12. The electronic device defined in claim 11 further comprising a tunable matching circuit coupled between the radio-frequency transceiver circuitry and the first antenna, wherein the tunable matching circuit is operable in a first mode in which the radio-frequency antenna signals are received by the first antenna in only first and second cellular telephone receive bands among the five cellular telephone receive bands and is operable in a second mode in which the radio-frequency antenna signals are received by the first antenna in only third and fourth cellular telephone receive bands among the five cellular telephone receive bands and wherein the first and second cellular telephone receive bands are different than the third and fourth cellular telephone receive bands.

13. The electronic device defined in claim 10 wherein the first end of the electronic device comprises a lower end of the electronic device, the second end of the electronic device comprises an upper end of the electronic device, and the peripheral conductive housing structures comprise at least three gaps that define at least three separate segments of the peripheral conductive member including the first and second segments, the at least three gaps each extending from a planar rear exterior surface of the electronic device to a planar front exterior surface of the electronic device.

14. The electronic device defined in claim 10 wherein the radio-frequency transceiver circuitry is configured to receive signals through the second antenna and the first antenna and wherein the radio-frequency transceiver circuitry is configured to transmit signals through only the second antenna and not the first antenna, so that the electronic device supports receiver diversity and not transmitter diversity.

15. An electronic device, comprising:
    a housing having opposing upper and lower ends;
    a display mounted within the housing, wherein the display has four edges;

peripheral conductive housing structures that run along the four edges of the display;

at least two dielectric-filled gaps in the peripheral conductive housing structures that separate the peripheral conductive member into at least first and second respective segments;

an antenna ground plane within the housing;

a dual-arm inverted-F antenna that is formed from the antenna ground plane and an inverted-F antenna resonating element that is separated from the antenna ground plane by an opening and that has first and second arms that resonate in respective frequency bands, wherein the inverted-F antenna resonating element is formed from the first segment, a first antenna feed terminal is coupled to the first segment, and a second antenna feed terminal is coupled to the antenna ground plane at the upper end of the housing;

a loop antenna having a resonating element that is formed from the second segment and the antenna ground plane at the lower end of the housing, wherein the resonating element of the loop antenna extends between a third antenna feed terminal coupled to the antenna ground plane and a fourth antenna feed terminal coupled to the second segment; and radio-frequency transceiver circuitry that is configured to transmit and receive radio-frequency antenna signals in a plurality of radio-frequency bands through the loop antenna and that is configured to receive radio-frequency antenna signals in only a subset of the plurality of radio-frequency bands through the dual-arm inverted-F antenna without transmitting any radio-frequency signals through the dual-arm inverted-F antenna.

16. The electronic device defined in claim 15, wherein the dual-arm inverted-F antenna comprises first and second portions extending from opposing sides of the first feed terminal in a common plane, wherein the first and second portions are configured to cover the respective frequency bands, and wherein the first and second portions each have a respective perpendicular bend.

17. The electronic device defined in claim 15, further comprising:

a fixed matching circuit coupled between the radio-frequency transceiver circuit and the loop antenna; and an adjustable matching circuit coupled between the radio-frequency transceiver circuit and the dual-arm inverted-F antenna.

18. The electronic device defined in claim 17, further comprising:

a power amplifier coupled between a transmitter circuit in the radio-frequency transceiver circuit and the fixed matching circuit; and a low noise amplifier coupled between a receiver circuit in the radio-frequency transceiver circuit and the fixed matching circuit.

19. The electronic device defined in claim 18, further comprising:

a satellite navigation system receiver circuit that is separate from the radio-frequency transceiver circuit and that is coupled to the adjustable matching circuit; and filtering circuitry coupled between the satellite navigation system receiver circuit and the adjustable matching circuit.

20. The electronic device defined in claim 19, further comprising:

an additional low noise amplifier coupled between the filtering circuitry and an additional receiver circuit in the radio-frequency transceiver circuit; and control circuitry, wherein the control circuitry is configured to provide control signals to the radio-frequency transceiver circuit over a first control path to selectively activate the receiver circuit and the additional receiver circuit, and wherein the control circuitry is configured to provide additional control signals over an additional control path to the adjustable matching circuit to tune the dual-arm inverted-F antenna.

* * * * *